Patented Jan. 10, 1939

2,143,618

UNITED STATES PATENT OFFICE 2,143,618

PROCESS OF APPLYING AND HARDENING COATINGS ON ARTICLES

Philip C. P. Booty and Raymond G. Booty, Chicago, Ill.

No Drawing. Application April 11, 1935, Serial No. 15,900

8 Claims. (Cl. 91—70)

Our invention relates to an improved process of applying and hardening coatings of synthetic resinous liquid solutions on the surfaces of articles of wood, metal, glass, or other suitable material. It is an object of our invention to provide an improved process by which a coating of a synthetic resinous liquid solution may be applied and cured in a uniform layer upon any article upon which a smooth, hard and even finish is desired.

It is one of the objects of our invention to provide an improved process by reason of which a continuous liquid coating of soluble resinous material applied on the surface of an article to be covered may be kept intact and of substantially uniform thickness over the entire surface of the article until the material has cured and become insoluble. To this end, it has been our aim to provide for keeping the surface tension of the freshly applied and uncured coating material lowered to such a point as to defeat any tendency for the material to crawl and form into patches of increased thickness at some places leaving other intermediate portions without any covering coat. It is another object of our invention to provide an improved process by which a film of a suitable agent may be provided over the uncured coating material for maintaining the coating material intact without breaks and without unevenness.

A further object of our invention is to provide an improved process by which an article may be provided with a coating of resinous material in the form of a liquid solution and by which, following the application of such coating, the major portion of the excess solvent employed in the solution may be removed and the applied coating material so conditioned that the solvent remaining therein may readily escape during the curing of the resinous coating material without being driven into the pores of the article and without causing the material to froth during the curing operation. This effect is brought about preferably by the use of a superposed film of an agent adapted to remove or extract the solvent of the material of the first coating and to reduce greatly its surface tension.

For the practice of our improved process, we employ a liquid synthetic resinous coating material preferably of the phenol-formaldehyde type which is adapted upon the application of heat to become hard and insoluble, polymerization of the material being retarded to the necessary extent by a suitable solvent such as methyl alcohol, which also functions as a dispersing medium for the resinous material.

The material we prefer to use for our coating operations is made as follows: 1000 parts by weight of commercially pure phenol are mixed with 1600 parts by weight of 40% formaldehyde to which 15 parts by weight of a suitable catalyst, such as sodium hydroxide, are added, and the resulting mixture is then heated under reflux conditions for a period of about four hours. At the end of that period approximately 34 parts by weight of a suitable neutralizing agent, such as lactic acid, are added to the mixture, and the whole is then dehydrated until the water content is approximately 20% of the whole. Water has a high surface tension and we prefer to reduce the water content of the aforesaid resulting mixture to a negligible amount, which may be done in any preferred manner. For example, about 15 parts by weight of methyl alcohol may be added to each 100 parts by weight of said mixture and heat applied for a period of ten or twelve hours at a temperature of about 75° C. Under such conditions the resin settles to the bottom of the vessel while the water collects in a layer on the surface of the resin. A separation of the resin and water may then be readily effected by drawing off the resin through a pipe leading into the bottom of the vessel. The water content of the resin so obtained should not be more than about 2% of the whole. The resin thus obtained constitutes the hereinafter mentioned base material. The material made as described is soluble. Upon being subjected to further heating it becomes insoluble.

In lieu of sodium hydroxide some other suitable catalyst, such as sodium carbonate or potassium hydroxide, may be used in an amount sufficient to produce the desired result.

Instead of lactic acid another suitable acid, such as hydrochloric acid or acetic acid may be employed as the neutralizing agent in sufficient quantity to produce the desired neutralizing effect.

To the aforesaid resinous base material freshly made, the desired amount of a suitable solvent is added to produce the desired liquid coating material. We have obtained good results by adding from 25 to 60 parts by weight of methyl alcohol to each 100 parts by weight of the resin. In lieu of methyl alcohol, a sufficient quantity of any other suitable agent, adapted to retard polymerization of the resin and serve as a vehicle or dispersing medium for the resin, such as ethyl alcohol, isopropyl alcohol, acetone or Methyl Cellosolve may be used. Methyl Cellosolve is the trade name of mono-methyl ether of ethylene glycol. The aforesaid agents may be used either separately or in combination with each other. The agent or solvent employed for the purposes mentioned should be sufficiently volatile so that it will readily evaporate when the coated articles are placed in the curing chamber in order that polymerization of the resinous material may then proceed without hindrance. The amount of methyl alcohol, or other equivalent agent, used depends to some extent on the age of the base material or resin, a greater proportion of solvent being desirable when the viscosity of the resin is increased by the ageing of the material, and it depends also on the condition of the surfaces of the articles to be coated. It will be obvious that a material more viscous in nature, that is to say, one in which the percentage of solvent with respect to the resin is relatively low, is more suitable for coating the surfaces of a piece of pine wood, for example, which has quite large pores, than it would be for coating a piece of hard wood such as hickory.

The coating material may be applied to the surfaces of the articles to be coated in any one of a number of ways, for example by dipping or immersing the articles in a bath of the coating material or by applying the material to the articles by means of a brush or a spraying device. The coating material is preferably used at a temperature ranging from about 25° to about 45° C., which is well below the boiling point of the solvent used in the material and yet high enough to lower the viscosity of the material to a point where it will flow readily. The temperature at which the material is used depends to a considerable extent upon the amount of solvent used, the age of the base material and the condition of the surfaces to be treated.

The surface tension of the resinous coating is quite high. If the coated articles be placed in the curing chamber without further treatment, the solvent, in an effort to escape due to the high temperature necessarily employed for curing, builds up a fairly high pressure within the resinous coating. In escaping through the external surface of the coating minute bubbles are produced by the solvent resulting in a frothy condition appearing on the outer surface of the coating and leaving it uneven, patchy and in a wholly unsatisfactory condition. Steps are taken, therefore, to overcome such difficulties.

After the articles have been coated with the aforesaid resinous material, a film of a suitable agent such as dipentene is then applied over the resinous coating preferably at a temperature ranging from a few degrees above the boiling point of the solvent employed in the resinous material to within a few degrees of the temperature at which the material is cured. When methyl alcohol is used as the solvent, which has a boiling point of 66° C., and the temperature of the curing chamber is about 100° C., the dipentene may be used at a temperature ranging from about 72° to about 95° C. The dipentene is preferably applied by dipping or immersing the resinous coated articles into a bath of the agent. In this manner a thin film of dipentene is applied on the outer face of the coating of resin and it serves to reduce substantially the surface tension of the resin and it extracts at least the major portion of the methyl alcohol contained in the resinous coating and enables the solvent remaining in the resin to escape readily by evaporation and without causing any frothing.

After a film of dipentene has been applied over the coating of resinous material the articles are placed in a heated curing chamber where they are subjected to a temperature of from 60 to 100° C. If only a single coat of the resinous material is to be applied, and in any case after the final coating has been applied, the articles are kept in the chamber until the coating of resin is completely polymerized which will require a period of from 50 to 100 hours, depending on the temperature in the chamber and on whether or not ventilation is provided for permitting the vapors driven off during the curing operation to escape from the chamber. Preferably the curing chamber is provided with means for ventilating it in order that the curing operation may proceed efficiently. If a second coating of the resin is to be applied, the articles are ordinarily left in the curing chamber only until the initial coating of resin has hardened sufficiently to permit convenient manipulation of the articles by hand.

The operation of applying the second coating of resin is preferably carried out in the same manner as that above described in connection with the application of the first coating. While the second coating of resin may be applied to the articles after they are removed from the curing chamber without further treatment, we prefer to apply a second film of dipentene to the articles after they are removed from the curing chamber and before the second coating of resin is applied in order to counteract the effect of any dirt or grease that may have accumulated on the articles by handling or otherwise. A third film of dipentene should be applied over the second coating of resin for the reasons heretofore pointed out. If additional coatings of the resin are to be applied after the second, the same procedure should be followed with respect to each additional coating as that just described in connection with the second coating.

The specific gravity of the resinous coating material is much higher than that of the dipentene. We have found that the process of applying the various coatings of the resinous material to the articles may be greatly simplified by using a tank containing a supply of the coating material and a supply of dipentene. The two materials readily separate into two distinct layers. As the articles are lowered into the tank they first pass through the layer of dipentene which overcomes the effect of any dirt or grease that may have collected on the articles and they are then brought into contact with the underlying body of resinous material with the result that a coating of substantial thickness adheres to the articles. As the articles are removed from the tank they are, of course, brought back up through the layer of dipentene with its attendant advantages and they are then ready for the initial, intermediate or final curing, as the case may be. By providing separate water jackets around such a tank with provision for maintaining the water in the upper jacket at a considerably higher temperature than that in the lower jacket, the dipentene may be maintained at a temperature substantially higher than that of the underlying body of resinous material.

In coating articles having flat surfaces of rather large area, it is desirable to take special precautions to prevent the coating material from running or forming ripples before the resin has polymerized sufficiently to be self-sustaining. One way which we have found to be effective in this connection is to place such articles vertically in the curing chamber and to permit the major portion of the surplus resinous material to drain off. In so doing, some ripples will develop in the uncured resin. By redipping the articles in dipentene and then placing them in a horizontal position in the curing chamber, the undesirable condition just mentioned can be overcome. The refreshing action of the second application of dipentene on the film thereof first applied and the re-established reduction of the surface tension of the underlying coating of resin in conjunction with the changed position of the articles in the curing chamber causes the extra coating accumulated in the ridges or high points to flow back into the adjacent and relatively shallow portions with the result that the coating when cured is not only continuous but is of substantially uniform thickness. Another method of preventing the formation of ripples on relatively large flat areas is to place the articles, after their surfaces have been coated with resin and a film of dipentene has been applied thereover, in suitable revolving racks in the curing chamber so that the articles may be slowly revolved while the resin is curing. When so handled, the coating of resin does not have a chance to run or flow to any substantial extent and any rippled condition in its surface is avoided. While this last mentioned method involves additional equipment, it is less expensive in the long run because less labor is required to carry it out.

After continuous use over a period of several days the bath of dipentene will become burdened or contaminated with impurities to such an extent that it will not function satisfactorily. When that occurs the old bath of dipentene may be discarded and a fresh supply used, or the old bath may be purified by distillation and then reused.

We have found that a number of other agents may be used in lieu of dipentene. We have had satisfactory results by the use of other cyclic terpenes having the formula $C_{10}H_{16}$, and by the use of other agents such as commercial spirits of turpentine, Perilla oil, commercial fish oil, sperm oil and boiled linseed oil. The agents may be used singly and also in combination with each other.

By the use of the film of dipentene, or other equivalent agent, applied at the steps in our process as above described, the surface tension of the underlying coating of resin is reduced to such an extent that the coating remains uniform in thickness, and intact and continuous without any breaks therein and without patchiness developing. By employing such an agent, no condition favorable to frothing of the resin occurs during the curing operation, even when that operation is carried out under substantially normal atmospheric pressure as we prefer due to the attendant advantages.

By the use of our improved process as above described, we have been enabled to apply finishing coatings of synthetic resinous material which become very hard and highly resistant to the action of any of the ordinary solvents or acids. We have found that by our improved process we are able to produce hardened coatings which are intact without any break in their continuity over the entire surface, such coatings being smooth and bright and being capable of taking a high and permanent polish.

The relative quantities of ingredients used in carrying out our process are the best known to us at this time for the purposes set forth but we are aware that the percentages can be varied to some extent without substantial detriment. Similarly, the details of the procedure of carrying out the various steps of our process can be varied without departing from the spirit of our invention as defined by the appended claims.

We claim:—

1. The herein described process of coating an article which comprises applying on the article a coating of a liquid solution of phenol-formaldehyde resin and a solvent selected from the group consisting of methyl alcohol, ethyl alcohol, isopropyl alcohol, acetone and Methyl Cellosolve then applying to the coating before it becomes insoluble a film of an agent adapted to reduce the surface tension of the coating and to have an extracting action on the solvent, and then applying heat to the article for polymerizing the resinous coating thereon.

2. The herein described process of coating an article which comprises dipping the article in a liquid solution of phenol-formaldehyde resin and a solvent selected from the group consisting of methyl alcohol, ethyl alcohol, isopropyl alcohol, acetone and Methyl Cellosolve, then immersing the coated article before the coating becomes insoluble in a bath of an agent adapted to reduce the surface tension of the coating and to have an extracting action on the solvent, and then applying heat to the article for polymerizing the resinous coating thereon.

3. The herein described process of coating an article which comprises dipping the article in a liquid solution of phenol-formaldehyde resin and a solvent selected from the group consisting of methyl alcohol, ethyl alcohol, isopropyl alcohol, acetone and Methyl Cellosolve, said solution being used at a temperature ranging from about 25° to about 45° C., then immersing the coated article before the coating becomes insoluble in a bath of an agent adapted to reduce the surface tension of the coating and to have an extracting action on the solvent, and then applying heat to the coated article for polymerizing the resinous coating thereon, the temperature of said bath ranging from a few degrees above the boiling point of the solvent to within a few degrees of the temperature at which the coating material is cured.

4. The herein described process of coating an article which comprises applying on the article a coating of a liquid solution of phenol-formaldehyde resin and a solvent selected from the group consisting of methyl alcohol, ethyl alcohol, isopropyl alcohol, acetone and mono-methyl ether of ethylene glycol, then applying to the coating before it becomes insoluble a film of an agent selected from the group consisting of cyclic terpenes having the formula $C_{10}H_{16}$, commercial spirits of turpentine, Perilla oil, commercial fish oil, sperm oil and boiled linseed oil to reduce the surface tension of the coating and to have an extracting action on the solvent, and then applying heat to the article for polymerizing the resinous coating thereon.

5. The herein described process of coating an article which comprises dipping the article in a liquid solution of phenol-formaldehyde resin and a solvent selected from the group consisting of methyl alcohol, ethyl alcohol, isopropyl alcohol, acetone and mono-methyl ether of ethylene glycol, then applying to the coating before it becomes insoluble a film of an agent selected from the group consisting of cyclic terpenes having the formula $C_{10}H_{16}$, commercial spirits of turpentine, Perilla oil, commercial fish oil, sperm oil and boiled linseed oil to reduce the surface tension of the coating and to have an extracting action on the solvent, and then applying heat to the article for polymerizing the resinous coating thereon.

6. The herein described process of coating an article which comprises dipping the article in a liquid solution of phenol-formaldehyde resin and a solvent selected from the group consisting of methyl alcohol, ethyl alcohol, isopropyl alcohol, acetone and mono-methyl ether of ethylene glycol, said solution being used at a temperature ranging from about 25° to about 45° C., then immersing the coated article before the coating becomes insoluble in a bath of an agent selected from the group consisting of cyclic terpenes having the formula $C_{10}H_{16}$, commercial spirits of turpentine, Perilla oil, commercial fish oil, sperm oil and boiled linseed oil to reduce the surface tension of the coating and to have an extracting action on the solvent, and then applying heat to the article for polymerizing the resinous coating thereon, the temperature of said bath ranging from a few degrees above the boiling point of the solvent to within a few degrees of the temperature at which the coating material is cured.

7. The herein described process of coating an article which comprises applying on the article a plurality of coats of a liquid solution of phenol-formaldehyde resin and a suitable solvent, applying on the article after each application of said solution thereto before the last applied solution has become insoluble a film of an agent adated to reduce the surface tension of the underlying coating and to have an extracting action on the solvent therein, and hardening the resin by the application of heat to the article after the application of each of said films of surface tension reducing agent, the final hardening at least being carried to the point where the resin becomes insoluble.

8. The herein described process of coating an article which comprises applying on the article a plurality of coats of a heated liquid solution of phenol-formaldehyde resin and a solvent selected from the group consisting of methyl alcohol, ethyl alcohol, isopropyl alcohol, acetone and mono-methyl ether of ethylene glycol, applying on the article after each application of said solution thereto before the last applied solution has become insoluble a film of a heated agent selected from the group consisting of cyclic terpenes having the formula $C_{10}H_{16}$, commercial spirits of turpentine, Perilla oil, commercial fish oil, sperm oil and boiled linseed oil for reducing the surface tension of the underlying coating, and hardening the resin by the application of heat to the article after the application of each of said films of surface tension reducing agent, the final hardening at least being carried to the point where the resin becomes insoluble.

PHILIP C. P. BOOTY.
RAYMOND G. BOOTY.